United States Patent
Munetoh

(10) Patent No.: US 7,392,403 B1
(45) Date of Patent: Jun. 24, 2008

(54) SYSTEMS, METHODS AND COMPUTER PROGRAM PRODUCTS FOR HIGH AVAILABILITY ENHANCEMENTS OF VIRTUAL SECURITY MODULE SERVERS

(75) Inventor: Seiji Munetoh, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/960,167

(22) Filed: Dec. 19, 2007

(51) Int. Cl.
*H04L 9/00* (2006.01)
*G06F 12/14* (2006.01)

(52) U.S. Cl. .......................... 713/193; 713/171; 380/28

(58) Field of Classification Search ................ 713/171, 713/193; 380/28
See application file for complete search history.

(56) References Cited

U.S. PATENT DOCUMENTS

| | | | |
|---|---|---|---|
| 7,222,062 B2 * | 5/2007 | Goud et al. ................... 703/23 |
| 2005/0246552 A1 | 11/2005 | Bade et al. |
| 2007/0094719 A1 * | 4/2007 | Scarlata ......................... 726/9 |
| 2007/0226786 A1 | 9/2007 | Berger et al. |
| 2007/0266256 A1 * | 11/2007 | Shah et al. .................. 713/178 |
| 2007/0300069 A1 * | 12/2007 | Rozas ......................... 713/176 |

* cited by examiner

*Primary Examiner*—Emmanuel L Moise
*Assistant Examiner*—Michael Pyzocha
(74) *Attorney, Agent, or Firm*—Cantor Colburn LLP; Vazken Alexanian

(57) ABSTRACT

Systems, methods and computer program products for high availability enhancements of virtual security module servers. Exemplary embodiments include a command processing method, including receiving a command from a virtual machine monitor in an I/O controller of a recipient virtual security appliance, determining a load of a crypto engine of the recipient virtual security appliance to assign a master/slave flag, the crypto engine having a master virtual trusted platform module and a slave trusted platform module, assigning a master/slave flag to the command to identify a command type, determining the command type in the I/O controller, receiving output from the crypto engine and returning the output to the virtual machine monitor.

3 Claims, 9 Drawing Sheets

SYSTEMS, METHODS AND COMPUTER PROGRAM PRODUCTS FOR HIGH AVAILABILITY ENHANCEMENTS OF VIRTUAL SECURITY MODULE SERVERS

BACKGROUND OF THE INVENTION

1. Field of the Invention

This invention relates to server security, and particularly to systems, methods and computer program products for high availability enhancements of virtual security module servers.

2. Description of Background

Virtual Security Appliances are a new concept to construct high assurance data centers, especially for x86 based Virtualization Infrastructures. In general, Hypervisors, that is, virtualization platforms that allow multiple operating systems to run on a host computer at the same time, are not well protected in x86 architecture.

Trusted Computing Group (TCG) has defined Trusted Platform Module (TPM) to enable hardware-based roots of trust for PC platforms. But this concept is now expanding to Server and Mobile platforms. TPM is fundamentally unique for each platform and operation system. However Virtual TPM (vTPM) has been proposed to Support Virtualized Operating Systems running on Virtual Machine Monitor.

SUMMARY OF THE INVENTION

Exemplary embodiments include a command processing method, including receiving a command from Virtual Machine Monitor (VMM) in an I/O controller of a recipient Virtual Security Appliance (VSA), determining a load of a crypto engine of the recipient VSA to assign a master/slave flag, the crypto engine having a master virtual Trusted Platform Module (vTPM) and a slave vTPM, assigning a master/slave flag to the command to identify a command type, determining the command type in the I/O controller, in response to a random command type, sending the command to the master vTPM and to the slave vTPM, generating a random number in the master vTPM, sending the random number to the slave vTPM, processing the command in the master vTPM and in the slave vTPM, sending the processed command to I/O controller as output, in response to a write command type sending the command to the master vTPM module and to the slave vTPM, processing the command in the master vTPM and in the slave vTPM, sending the processed command to the I/O controller as output, in response to a read command type sending the command to the master vTPM, sending the command to the I/O controller as output, receiving output from the crypto engine and returning the output to the VMM.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which implements Virtual Security Appliance to host multiple vTPM instances used by a guest operating system on multiple nodes.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
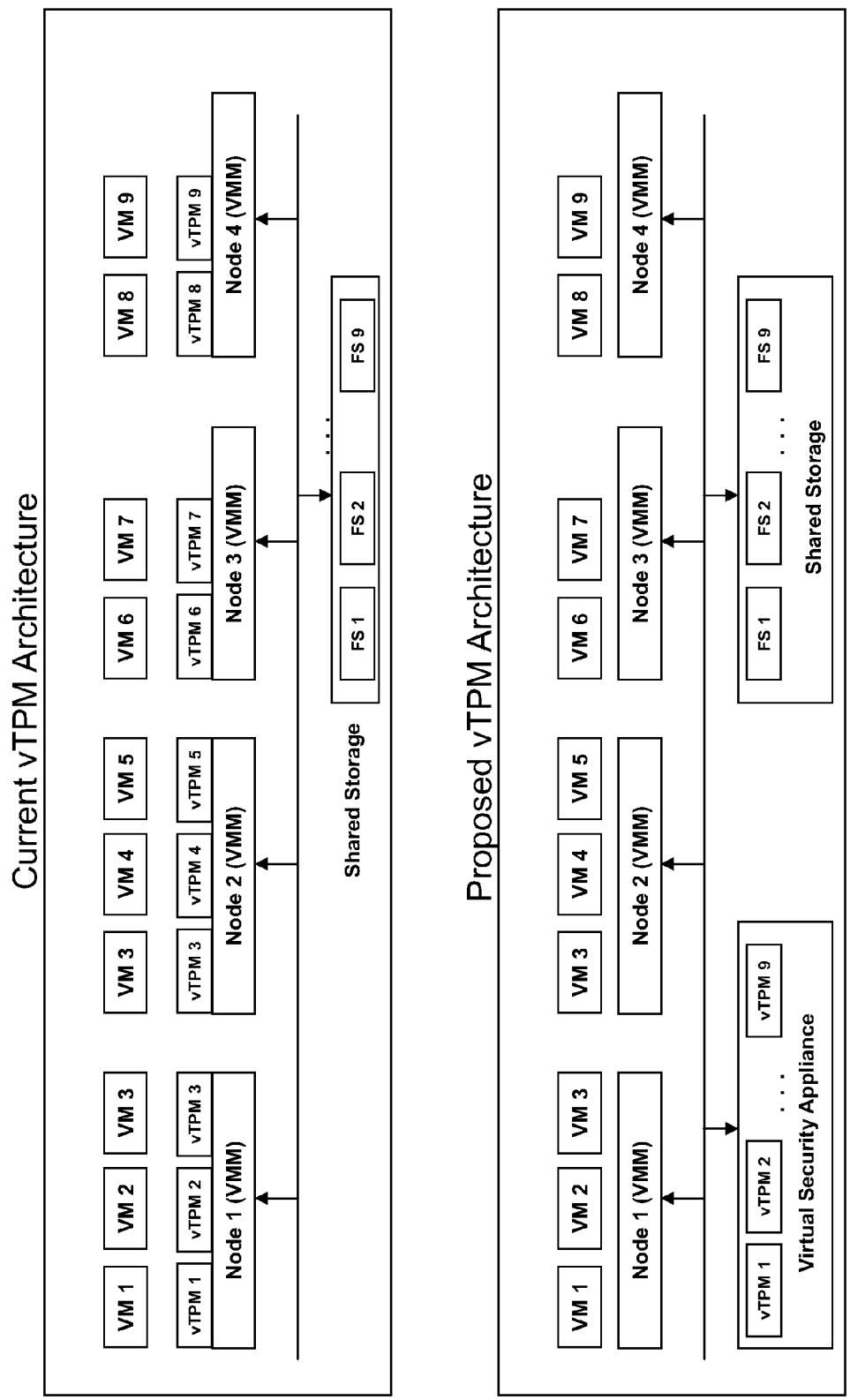
FIG. 1 illustrates a system block diagram of a vTPM system in accordance with exemplary embodiments.
Figure 2:
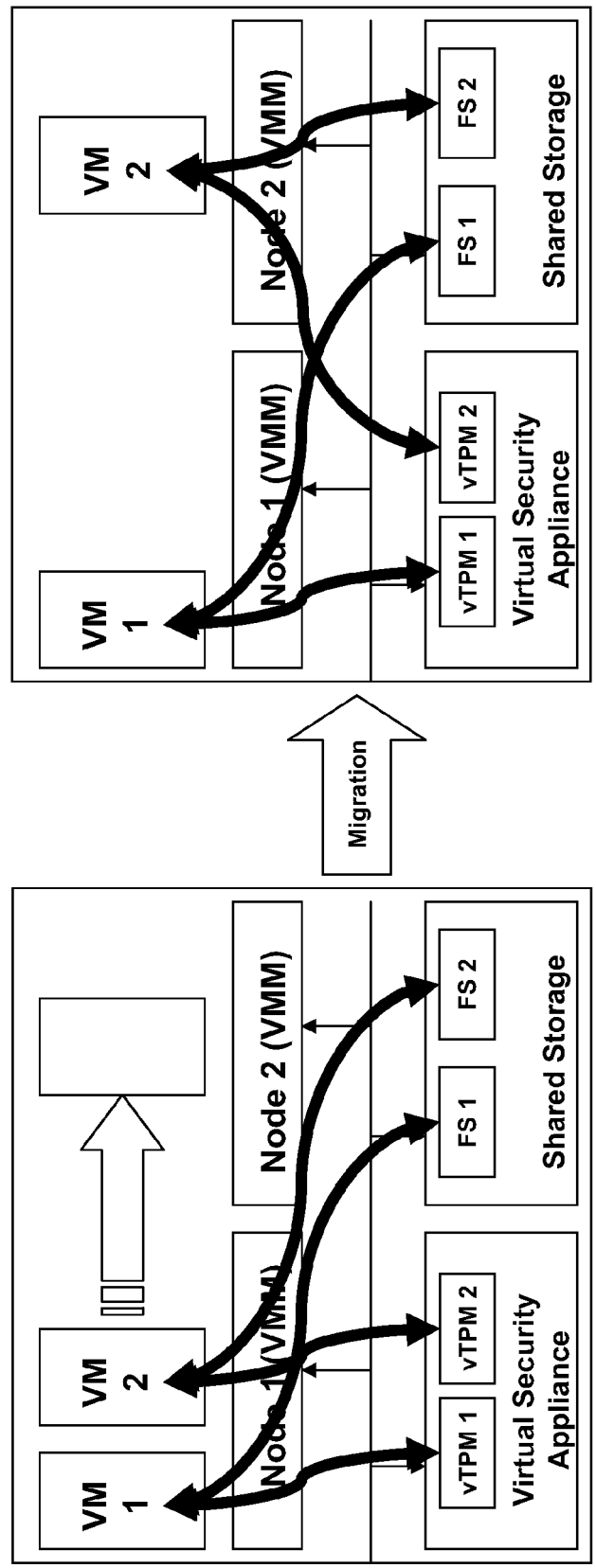
FIG. 2 illustrates another system block diagram of a vTPM system in accordance with exemplary embodiments.

FIGS. 1 and 2 illustrate system block diagrams of vTPM systems in accordance with exemplary embodiments. In exemplary embodiments, a "Virtual Security Appliance" hosts multiple vTPM instances, which are used by Guest OS on each node (Machine and Hypervisor). In exemplary embodiments, Live Migration is an important use case but to support this with existing architecture, both Guest OS image and vTPM instance are migrated to the target node, if vTPM is managed by each node. Similar to a shared storage, "Virtual Security Appliance" simplifies this scenario. In exemplary embodiments, the "Virtual Security Appliance" provides: checks on the security level of nodes; Easy Live Migration of Operating System, which utilizes TCG/TPM; High performance in which a crypto accelerator implements vTPM, etc; and ease of design of the vTPM hosting environment. However, it is appreciated that reliability can become a single point of failure of data center.

FIG. 2 illustrates another system block diagram of a vTPM system in accordance with exemplary embodiments, illustrating VM migration with a Virtual Security Appliance. Before actual migration commences, the Virtual Security Appliance validates the target node as having a legitimate VMM and a same security level of the current hosting node. If these conditions are true, then the source node transfers the Gust OS memory image to the destination node and the network connection of vTPM and shared storage. As a result, vTPM and shared storage are maintained seamlessly.

In exemplary embodiments, there are some differences between the security appliance and the storage server. For example, the security appliance must keep secret information and are never exposed from the appliance. In addition, the same random number generation is impossible by a different appliance. In exemplary embodiments, to support High Availability, a redundant Virtual Security Appliance Architecture can be implemented. The Virtual Security Appliance Architecture includes: I/O controller and Crypto Engine and a secure channel between each Crypto Engines. In exemplary embodiments, the I/O controller and Crypto Engine include an Independent Master/Slave assignment for I/O Controller and Crypto Engine. In exemplary embodiments, the Crypto Engine (Master/Slave) is dynamically assigned and optimizes the performance to balance the load of each engine. In exemplary embodiments, the I/O Controller (Primary/Backup) is statically assigned and defined at set up time. In addition, the I/O controller monitors engine load and assigns the Master/Slave role by commands. In exemplary embodiments the secure channel between each Crypto Engines is a special channel used to synchronize the internal state of Crypto Engines since some operation uses random number generation. Such operations are executed only by the Master Crypto engine and synchronize with Slave Engine by using this secure channel.

Figure 3:
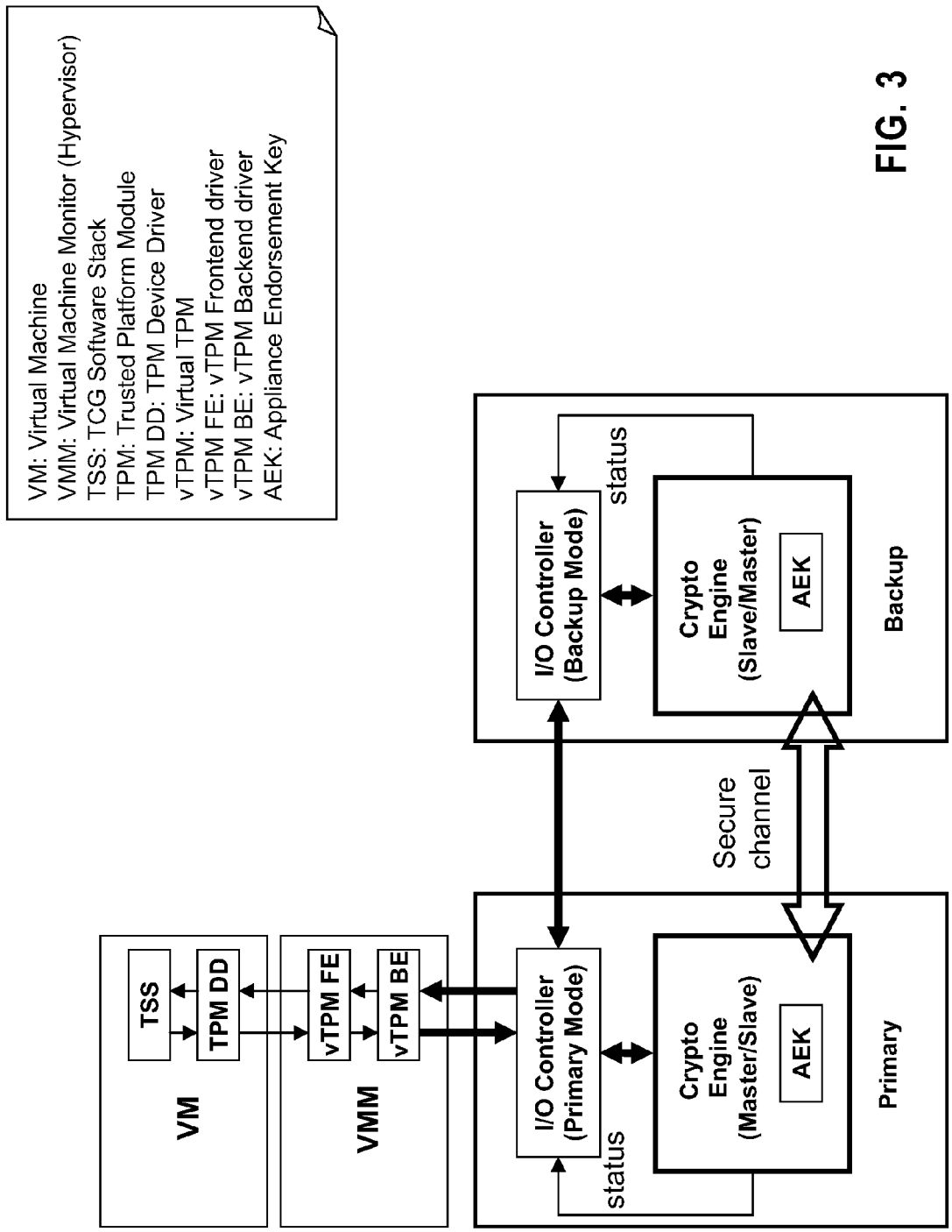
FIG. 3 illustrates a system block diagram of Virtual Security Appliance architecture in accordance with exemplary embodiments.
Figure 4:
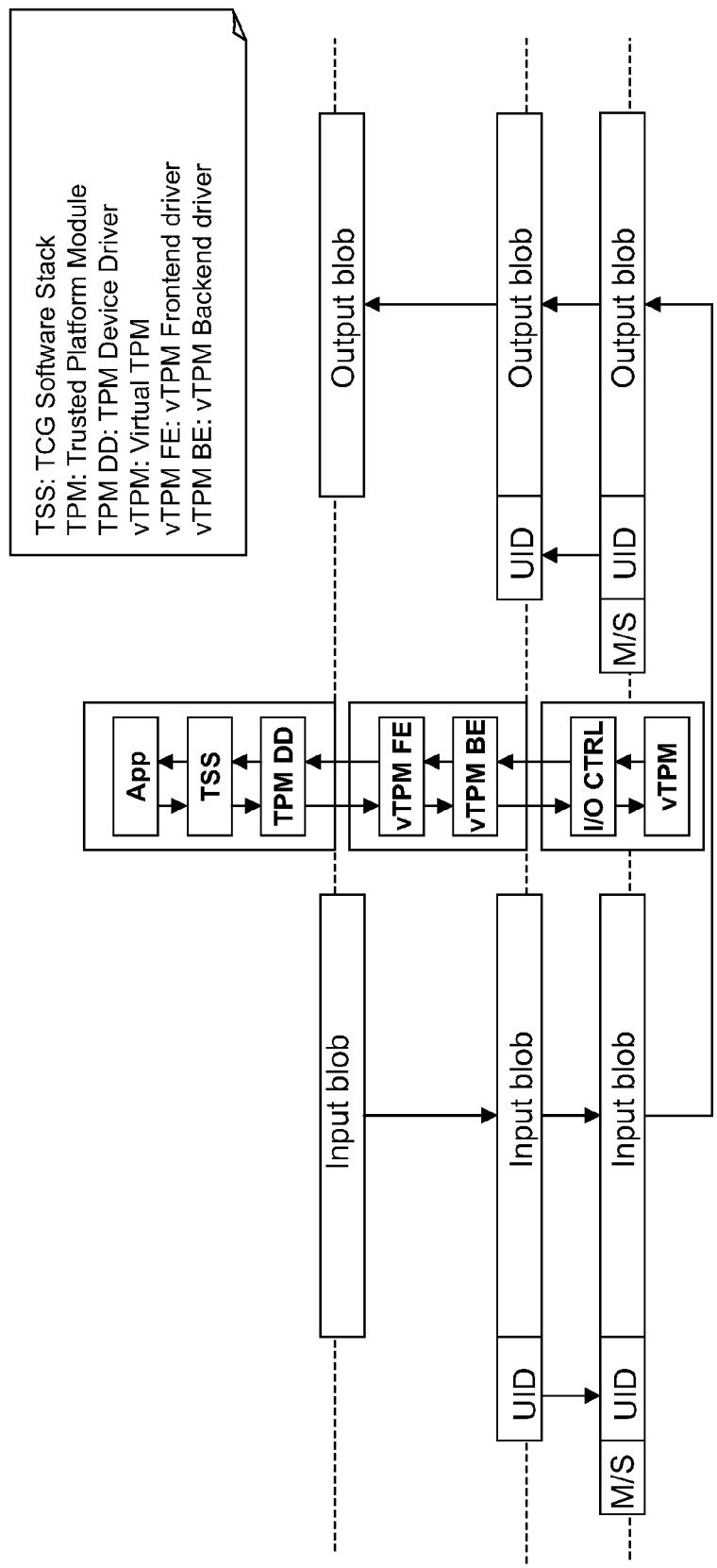
FIG. 4 illustrates a data flow of Virtual Security Appliance architecture in accordance with exemplary embodiments.

FIG. 3 illustrates a system block diagram of Virtual Security Appliance architecture in accordance with exemplary embodiments. In exemplary embodiments, the Appliance has endorsement key (Appliance Enforcement Key, AEK) to manage a Primary/Backup authorized Pair. FIG. 3 further illustrates an implementation example of Virtual Security Appliance which hosts vTPM, which includes: command management; I/O Controller & Crypto Engine; fault management and deployment.

In exemplary embodiments, command management includes vTPM command blobs. In exemplary embodiments, from GuestOS(VM), the vTPM is the same as a normal TPM chip. Furthermore, the Virtual Security Appliance and the VMM manage vTPM are assigned for each VM based on UID. In exemplary embodiments, I/O Controller adds a "Master/Slave Flag" to inbound blobs and then sends it to the Crypto Engine. In exemplary embodiments, the assignment is decided by the load of each of the crypto engines. The flag contains following information: Master/Slave; Command Type (Random/Write/Read); and Slave Sync (to identify if the slave is live or not). In exemplary embodiments, the outbound blob from vTPM is checked by the I/O Controller and is sent back to the VMM node.

For command management, there can be three type of commands: Random, which uses random number generation, and in which the engine needs to synchronize to keep same internal state; Write, which updates the internal state but does not need to be synchronized by each engine; and Read, in which the internal state is not changed. In exemplary embodiments, the I/O Controller checks the type of command and then assigns the Master/Slave flag. Furthermore, the Crypto Engine checks this flag and processes each request.

Figure 5:
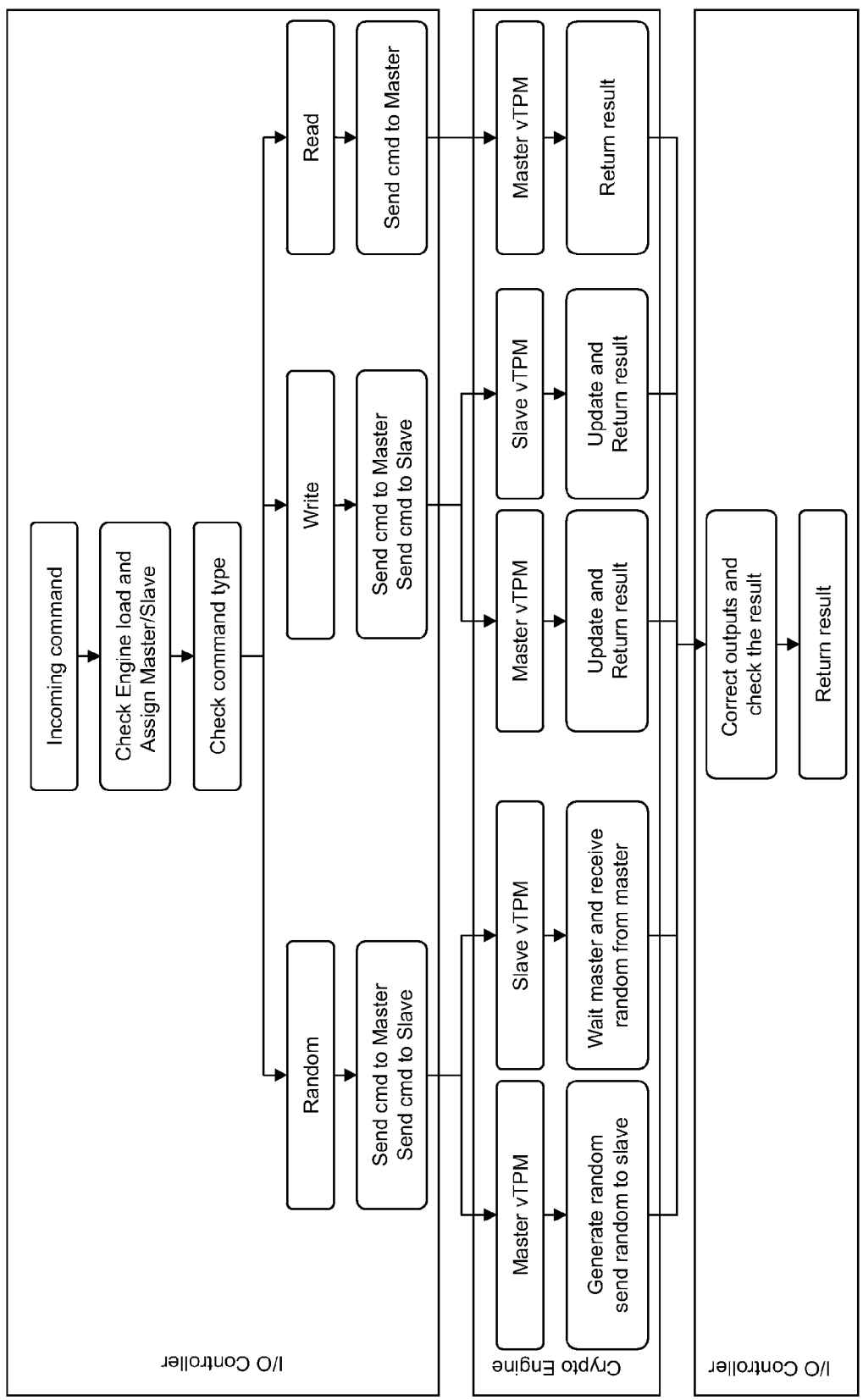
FIG. 5 illustrates a block diagram of command management operation flow of the I/O controller and the Crypto Engine in accordance with exemplary embodiments.

FIG. 5 illustrates a block diagram of command management operation flow of the I/O controller and the Crypto Engine in accordance with exemplary embodiments. The I/O Controller includes several functions including: Controlling and Monitoring the Crypto Engine; Synchronizing Primary and Backup appliances; Attesting the Integrity of Node (VMM) (i.e., TCG Remote Attestation); providing Node (VMM) Policy Management; and providing an Administration interface. In exemplary embodiments, TCG Remote Attestation occurs at both the start of vTPM session between appliance and node and at the start of VM migration.

Figure 6:
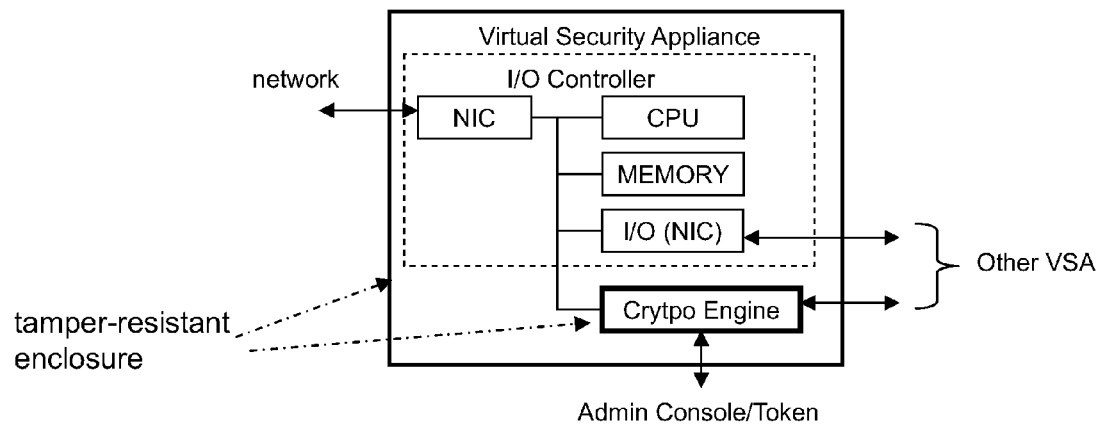
FIG. 6 illustrates a block diagram of a Virtual Security Appliance in accordance with exemplary embodiments.

The Crypto Engine includes several functions including providing: a Tamper-resistant (FIPS-140-3 level 3 or 4) for secure storage; a Host vTPM instance; a Secure Channel; and an Administration module which is managed by vendors and provides pair Authentication. FIG. 6 illustrates a block diagram of a Virtual Security Appliance in accordance with exemplary embodiments.

For fault management, fault detection is provides, which includes: a start up self test, for both the i/O Controller and the Crypto Engine; an external heartbeat that monitors the I/O Controller (Virtual Security Appliance); and the I/O Controller monitor Crypto Engine.

When the Crypto Engine halts during command processing, the command is re-issued by I/O Controller. The following table illustrates fault locations, with respective execution commands and actions.

| Fault location | Execution Command | Action |
| --- | --- | --- |
| Master Engine | Random | 1) Detect timeout<br>2) Cannel command issued to Slave Engine<br>3) Re-issue the command to another Engine as Master<br>4) Disable this engine |
| | Write | 1) Detect timeout<br>2) Keep Slave Engine operation and return Slave output to Node/VM<br>3) Disable this engine |
| | Read | 1) Detect timeout<br>2) Re-issue the command to another Engine as Master<br>3) Disable this engine |
| Slave Engine | Random | 1) Detect timeout<br>2) Do not wait Slave output and return Master Engine result<br>3) Disable this engine |
| | Write | 1) Detect timeout<br>2) Do not wait Slave output and return Master Engine result<br>3) Disable this engine |
| | Read | n/a (Slave is not used) |

Figure 7:
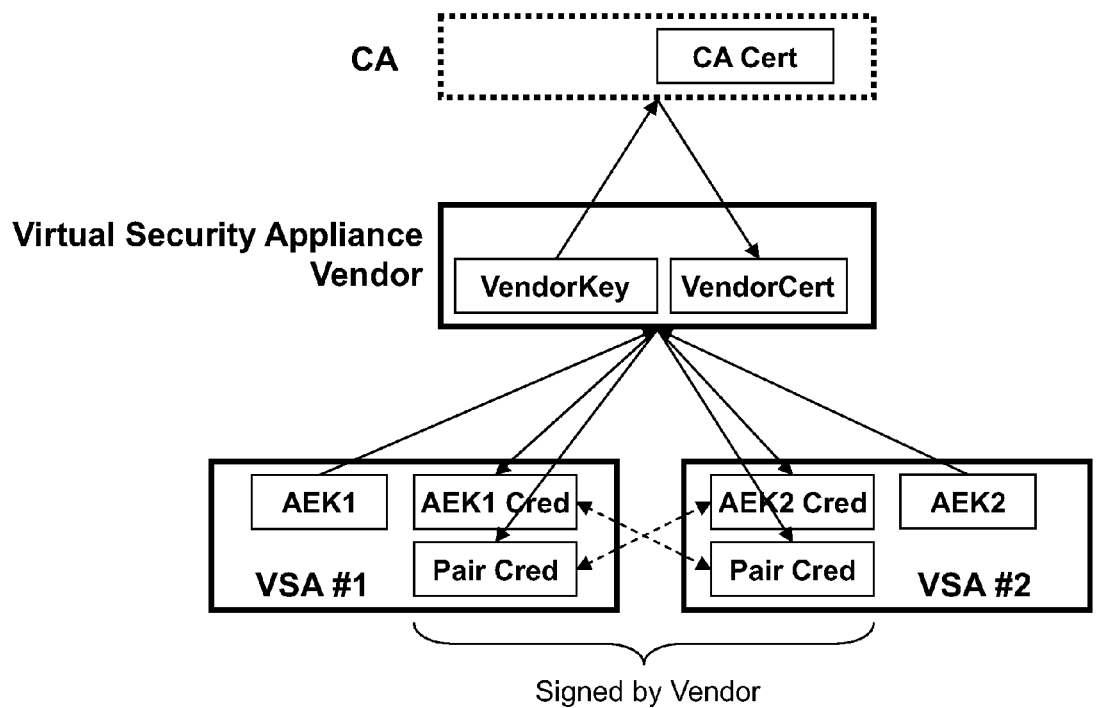
FIG. 7 illustrates a system block diagram of an endorsement key and a pair credential in accordance with exemplary embodiments.

For an authorized engine pair and management a Virtual Security Appliance (VSA) has unique key, an Appliance Endorsement Key (AEK) to identify itself, and a credential of other VSAs to be paired. In exemplary embodiments, the Appliance Endorsement Key (AEK) is stored in the Crypto Engine and is signed by the vendor (i.e., the Vendor key may signed by Root CA). In exemplary embodiments, the Pair Credential is signed by Vendor and describes a pair (i.e., AEK pub of each VSA). In exemplary embodiments, the AEK and the Pair Credential are used for authentication of the VSA and a Key Exchange between appliances to protect the Secure Channel. FIG. 7 illustrates a system block diagram of an endorsement key and a pair credential in accordance with exemplary embodiments.

Figure 8:
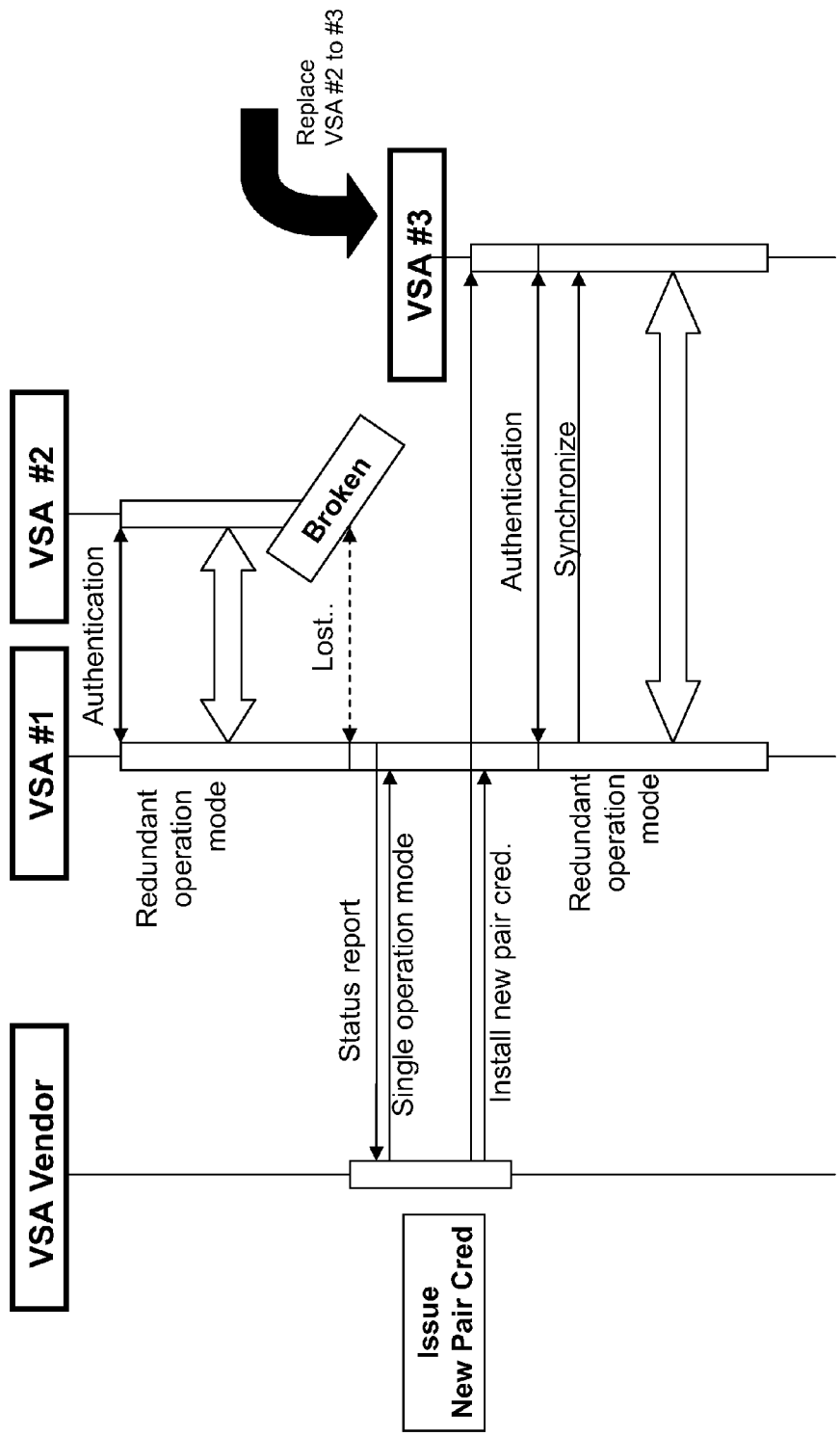
FIG. 8 illustrates an example of a procedure to replace a broken appliance in accordance with exemplary embodiments.

In exemplary embodiments, the systems and methods described herein can be implemented to replace a broken appliance. To protect the appliance pair from illegal detachment, a single operation mode can be activated by the Appliance Vendor, and the vendor can re-issue a new Pair Credential and replace the failure appliance to a new one FIG. 8 illustrates an example of a procedure to replace a broken appliance in accordance with exemplary embodiments.

In exemplary embodiments, Legitimate Replacement Procedures include the following steps: 1) Detect the failure; 2)

Figure 9:
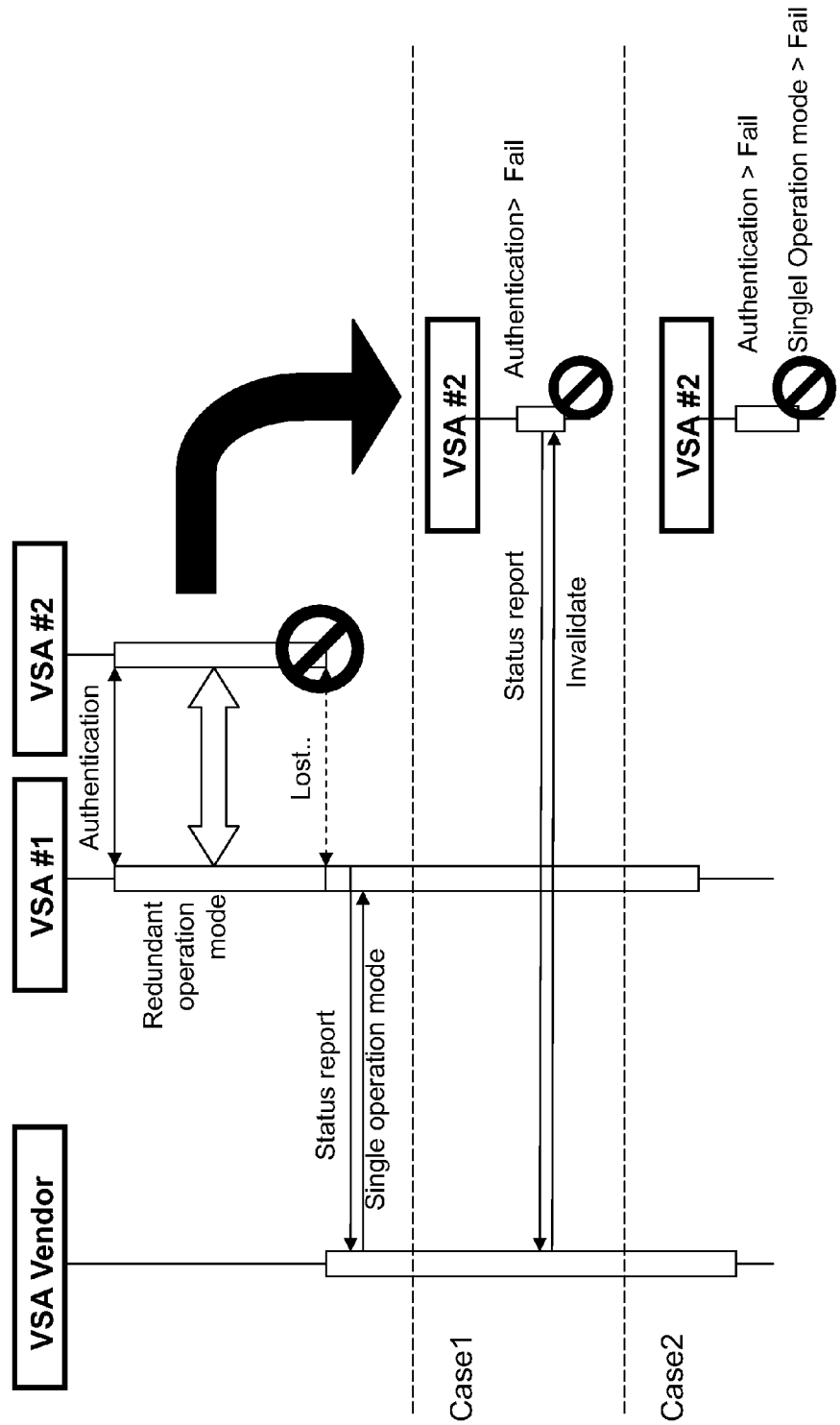
FIG. 9 illustrates a block diagram of an example of an illegal replacement of a VSA to steal hosted vTPMs in accordance with exemplary embodiments.
Figure 10:
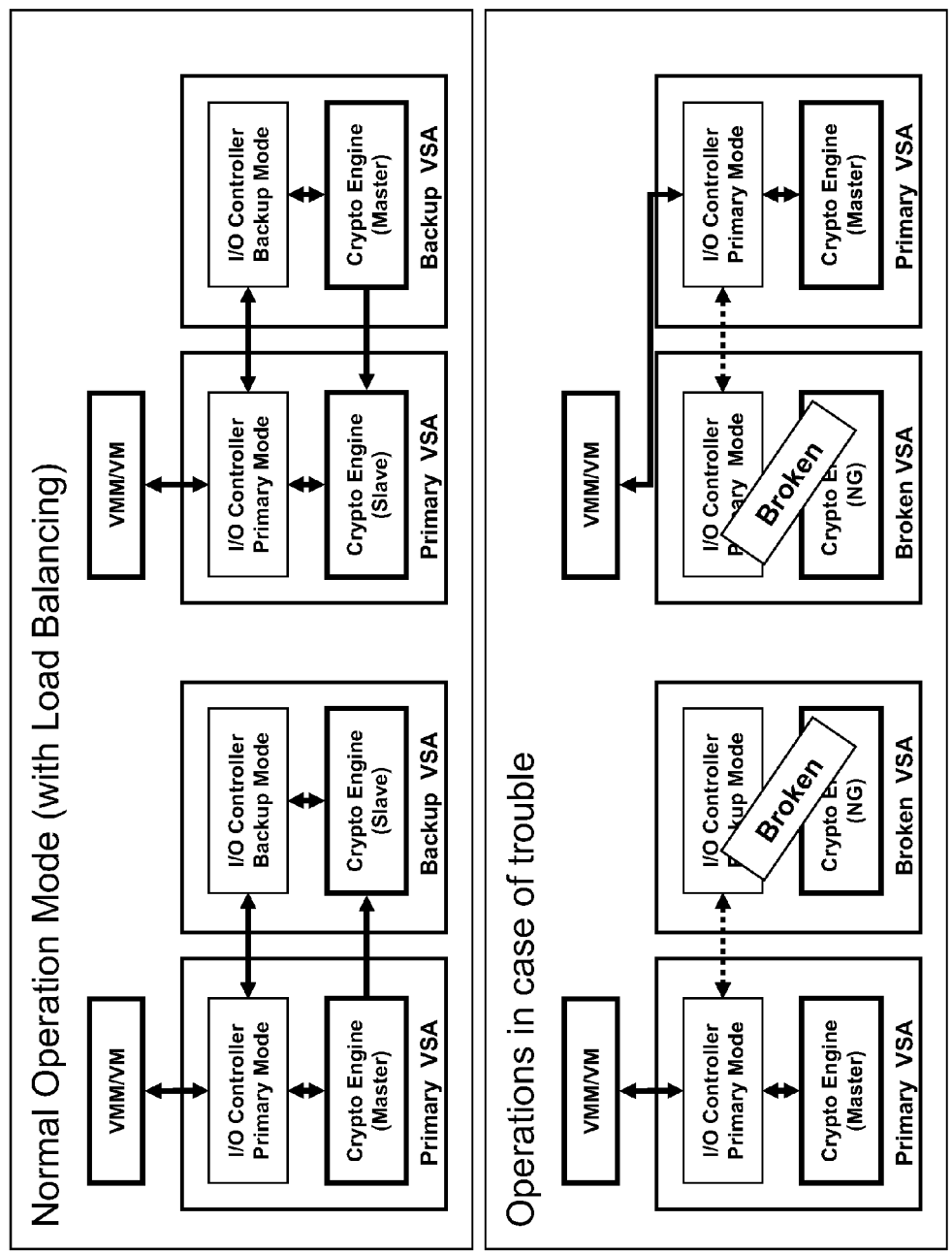
FIG. 10 illustrates block diagrams illustrating a summary of Virtual Security operation modes in accordance with exemplary embodiments.

Inform the status to the vendor and have the vendor activate the rest VSA to a single operation mode; 3) Have the vendor prepare a new VSA and issue a new Pair Credential; 4) Install a new Pair Credential and Replace the broken VSA with a new one; and 5) Pair the VSA authenticated automatically, and start synchronization and redundant operation mode. In exemplary embodiments, if the detached appliance is used without pair authentication (i.e., single operation mode), it requires the vendor's activation. FIG. 9 illustrates a block diagram of an example of an illegal replacement of a VSA to steal hosted vTPMs in accordance with exemplary embodiments. As such, if an appliance asked activation, it is invalidated as in case 1 in FIG. 9. In addition, without vendor activation, the VSA does not provide service, as illustrated in case 2 in FIG. 9. FIG. 10 illustrates block diagrams illustrating a summary of Virtual Security operation modes in accordance with exemplary embodiments.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. In a virtual security appliance system, a command processing method, comprising:
   receiving a command from a Virtual Machine Monitor in an I/O controller of a recipient Virtual Security Appliance in the virtual security appliance system;
   determining a load of a crypto engine of the recipient virtual security appliance to assign a master/slave flag, the crypto engine having a master virtual Trusted Platform Module and a slave virtual Trusted Platform Module;
   assigning a master/slave flag to the command to identify a command type;
   determining the command type in the I/O controller;
   in response to a random command type:
      sending the command to the master virtual Trusted Platform Module and to the slave virtual Trusted Platform Module;
      generating a random number in the master virtual Trusted Platform Module;
      sending the random number to the slave virtual Trusted Platform Module;
      processing the command in the master virtual Trusted Platform Module and in the slave virtual Trusted Platform Module;
      sending the processed command to the I/O controller as output;
   in response to a write command type:
      sending the command to the master virtual Trusted Platform Module and to the slave virtual Trusted Platform Module;
      processing the command in the master virtual Trusted Platform Module and in the slave virtual Trusted Platform Module;
      sending the processed command to the I/O controller as output
   in response to a read command type:
      sending the command to the master virtual Trusted Platform Module
      sending the command to the I/O controller as output;
   receiving output from the crypto engine; and
   returning the output to the Virtual Machine Monitor.

2. The method as claimed in claim 1 wherein the crypto engine includes an appliance endorsement key configured to provide an identification and to pair with an additional recipient virtual security appliance in the virtual security appliance system, the additional recipient virtual security appliance including an additional crypto engine having an additional appliance endorsement key.

3. The method as claimed in claim 2 further comprising:
   establishing a pair credential between the recipient virtual security appliance and the additional recipient virtual security appliance; and
   establishing a secure channel between the recipient virtual security appliance and the additional recipient virtual security appliance through an exchange of the appliance endorsement key and the additional appliance endorsement key through the pair credential.

* * * * *